UNITED STATES PATENT OFFICE.

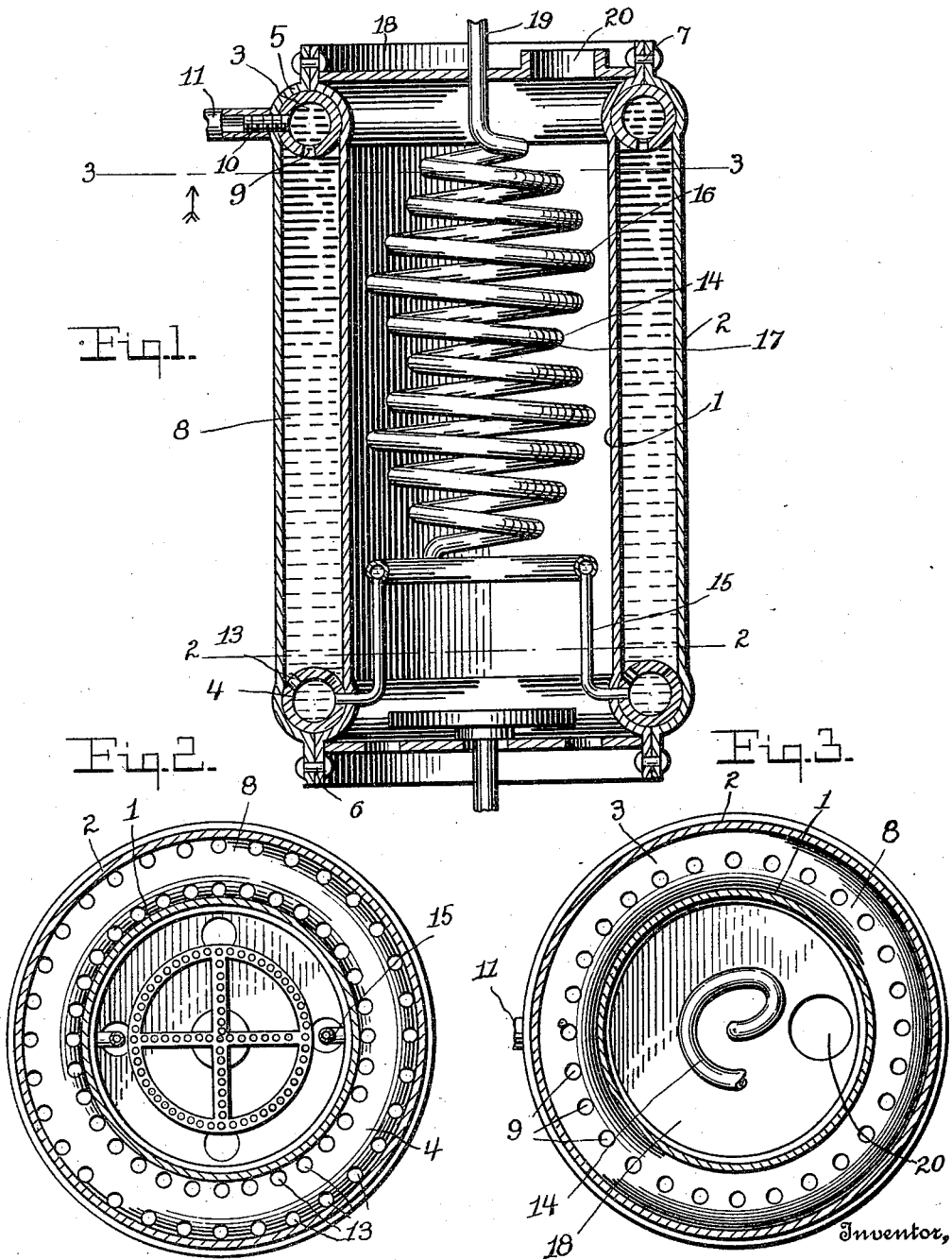

WILLIAM WELLS, OF CLEVELAND, OHIO.

HOT-WATER HEATER.

1,052,295.  Specification of Letters Patent.  Patented Feb. 4, 1913.

Application filed June 26, 1912. Serial No. 706,120.

*To all whom it may concern:*

Be it known that I, WILLIAM WELLS, a subject of the King of Great Britain, residing at Cleveland, in the county of Cuyahoga and State of Ohio, have invented new and useful Improvements in Hot-Water Heaters, of which the following is a specification.

This invention relates to hot water heaters and particularly to a heater designed for domestic purposes and has for an object to provide a heater that can be readily connected with a water supply source and with a domestic boiler, the heater being provided with means whereby the water as it is received from the supply source may be heated to a high degree with a minimum expenditure of fuel.

Another object of the invention is to provide a heater which will include a heating coil and an auxiliary heating chamber whereby the water may be discharged thereinto as it leaves the supply source and its temperature materially increased before the water is discharged to the heating coil.

A still further object of the invention is to provide a water heater wherein the water may be evenly distributed or conducted around the chamber of the boiler whereby to minimize the cooling action of the water against the walls of the chamber and to maximize the heating efficiency of the device.

In the drawings forming a portion of this application, and in which like letters of reference indicate similar parts in the several views:—Figure 1 is a vertical section through the heater. Fig. 2 is a horizontal section therethrough taken on line 2—2 of Fig. 1. Fig. 3 is a section on line 3—3 of Fig. 1 looking in the direction of the arrow.

My improved hot water heater comprises an inner casing 1 and an outer casing 2 between which are secured an annular feed pipe 3 and a similar outlet pipe 4, the walls of the casings 1 and 2 being struck up at their opposite ends as at 5 so as to partly embrace the pipes 3 and 4 as shown. Beneath the pipe 4 the walls of the casings 1 and 2 are secured together as by the rivets 6. At the upper ends the walls of the casings are secured together by rivets 7. In addition to securing the pipes 3 and 4 between the walls 1 and 2 as described, solder may be used as a binding and sealing agent between the pipes and the casing so as to effect water tight connections.

The casings 1 and 2 are spaced apart to provide an intervening chamber 8 therebetween in which the water is adapted to be heated to an extent before it passes to the main heating coil. The upper pipe 3 is provided with an annular series of downwardly opening perforations 9 from which water is adapted to discharge to the chamber, a nipple 10 extends laterally from the pipe 3 and through the upper end of the casing 2, being connected with a water supply pipe 11.

The lower pipe 4 is provided with concentric series of annular perforations 13 by means of which the water is free to pass to the pipe 4 so as to be subsequently discharged to the main heating coil 14. The main heating coil is located in the casing 1 and connected with the pipe 4 as at 15. The coil 14 may be of any suitable well known construction, being preferably provided with substantially double conical upper and lower portions 16 and an intermediate series of small convolutions 17. The convolutions of the upper and lower coils are preferably arranged in close proximity to each other and the largest convolution of each coil is preferably co-extensive in width to the coil receiving space of the casing 1 whereby the convolutions are thoroughly subjected to the heat. With a view to retaining the heat in the device it is preferable to provide the inner casing 1 with a closure 18. The discharge convolution 19 of the coil is extended through the cap 18 and may be connected in any obvious manner with the usual domestic boiler not shown. The said cap is also provided with a flue flange 20 whereby the gaseous products can be discharged to any suitable waste pipe.

From the construction of the device described it is evident that the water as it discharges from the pipe 3 will be evenly distributed to the chamber 8, where it may be thoroughly subjected to the heated inner walls thereof to be heated with utmost rapidity as will be understood.

I claim:—

A hot water heater comprising spaced inner and outer casings, having the faces of their opposed walls adjacent the bottom and top edges thereof formed with outwardly struck up portions, a horizontally disposed perforated pipe, arranged between the casing at the upper end thereof, and one horizontally disposed perforated member arranged between the casing at the lower ends thereof, said former and latter perforated members being partially embraced by said outwardly struck up portions, a water supply connected with the former mentioned, perforated member and extending laterally from the upper end of the casing and a heating coil located in the inner casing and connected with the latter mentioned perforated member at diametrically opposed points.

In testimony whereof I affix my signature in presence of two witnesses.

WILLIAM WELLS.

Witnesses:
M. W. DUNKIN,
JAS. F. DUNKIN.

Copies of this patent may be obtained for five cents each, by addressing the "Commissioner of Patents, Washington, D. C."